Figure 1:
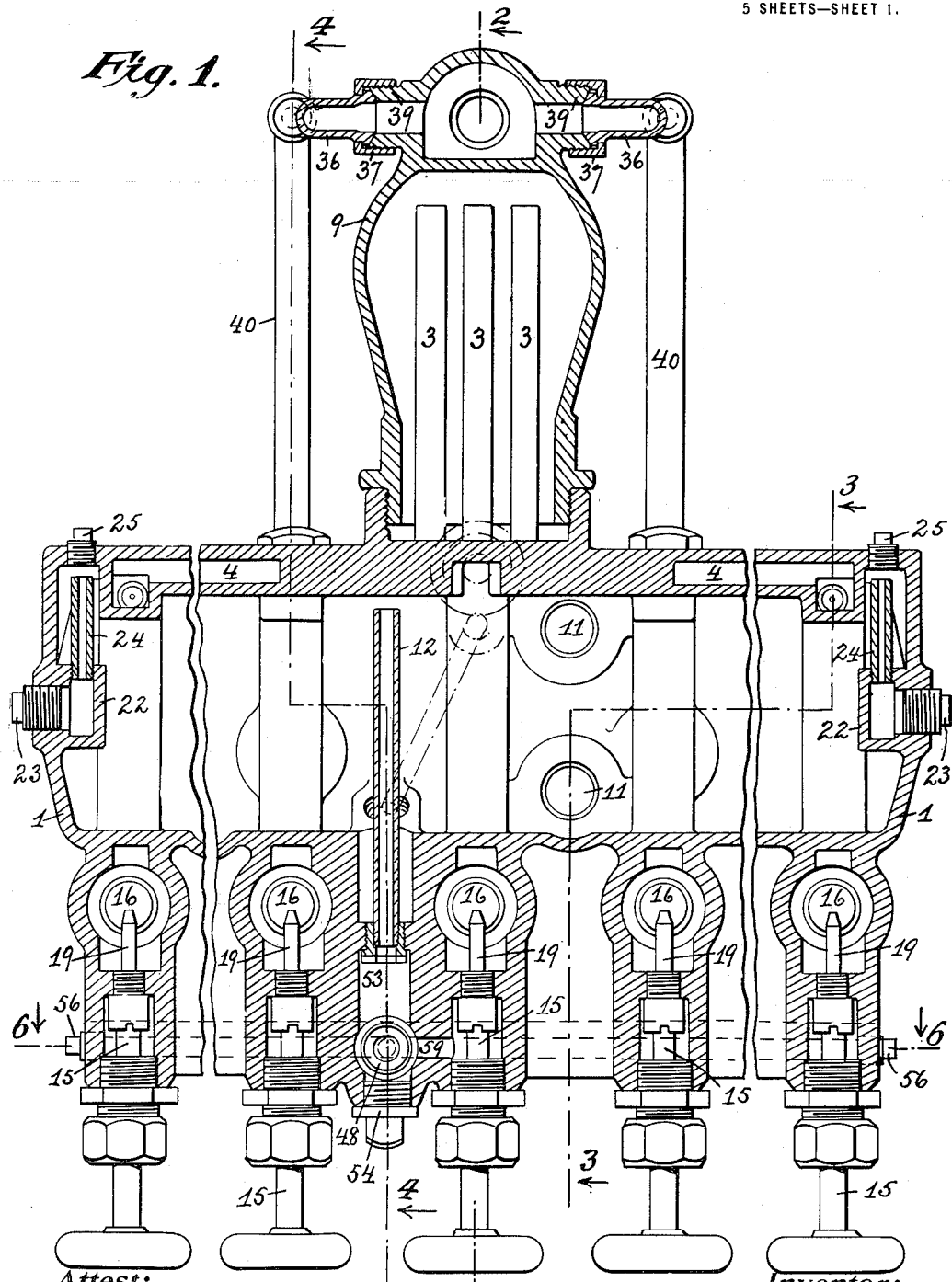

L. KASSANDER.
SIGHT FEED LUBRICATOR FOR LOCOMOTIVES.
APPLICATION FILED DEC. 24, 1913.

1,153,113.

Patented Sept. 7, 1915.
5 SHEETS—SHEET 1.

Attest:
Edgeworth Greene
Helen V Fitzpatrick

Inventor:
Leopold Kassander
by William R Baird
his Atty

L. KASSANDER.
SIGHT FEED LUBRICATOR FOR LOCOMOTIVES.
APPLICATION FILED DEC. 24, 1913.

1,153,113.

Patented Sept. 7, 1915.
5 SHEETS—SHEET 2.

Attest:
Edgeworth Greene
Helen V. Fitzpatrick

Leopold Kassander, Inventor:
by William R. Baird
his Atty

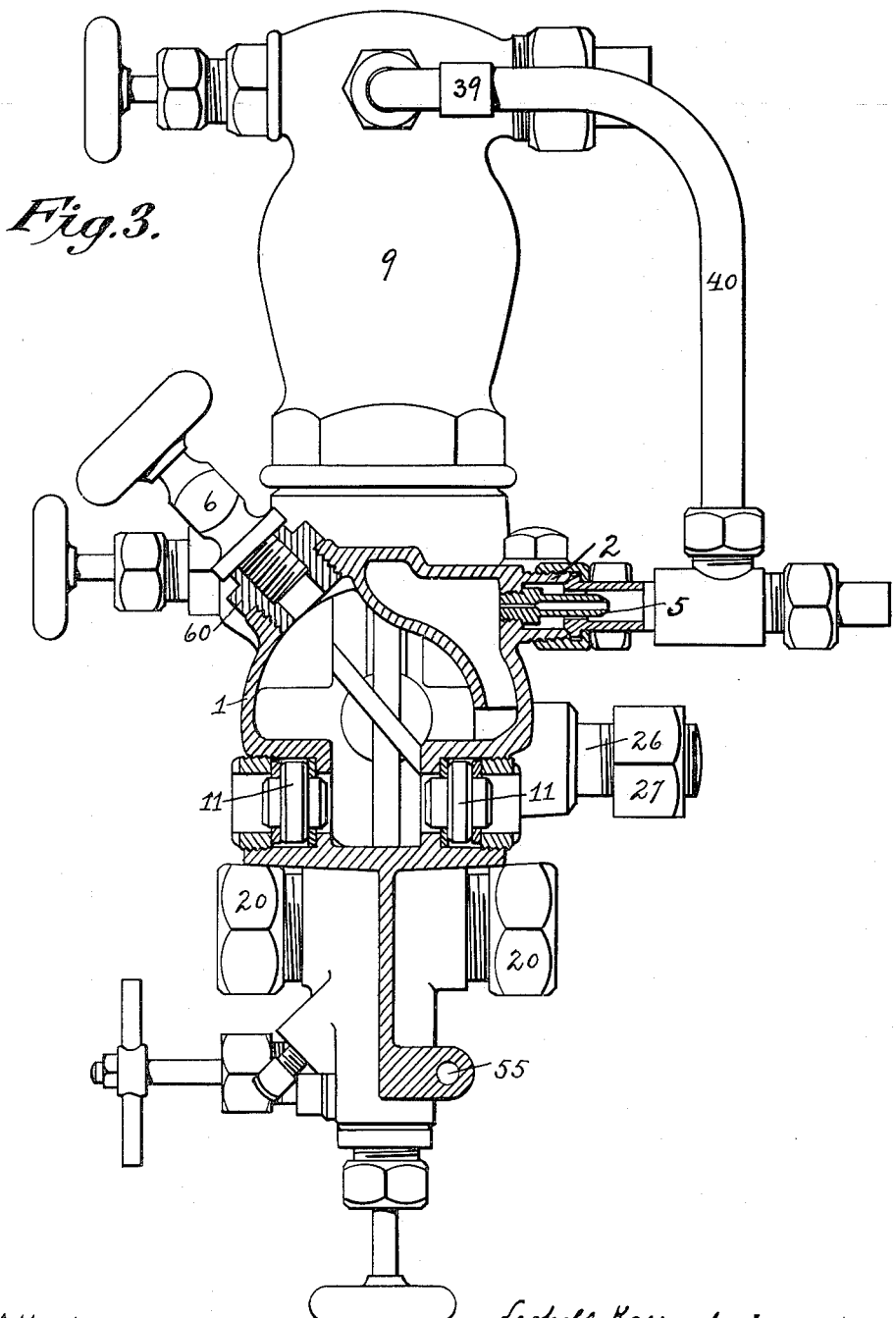

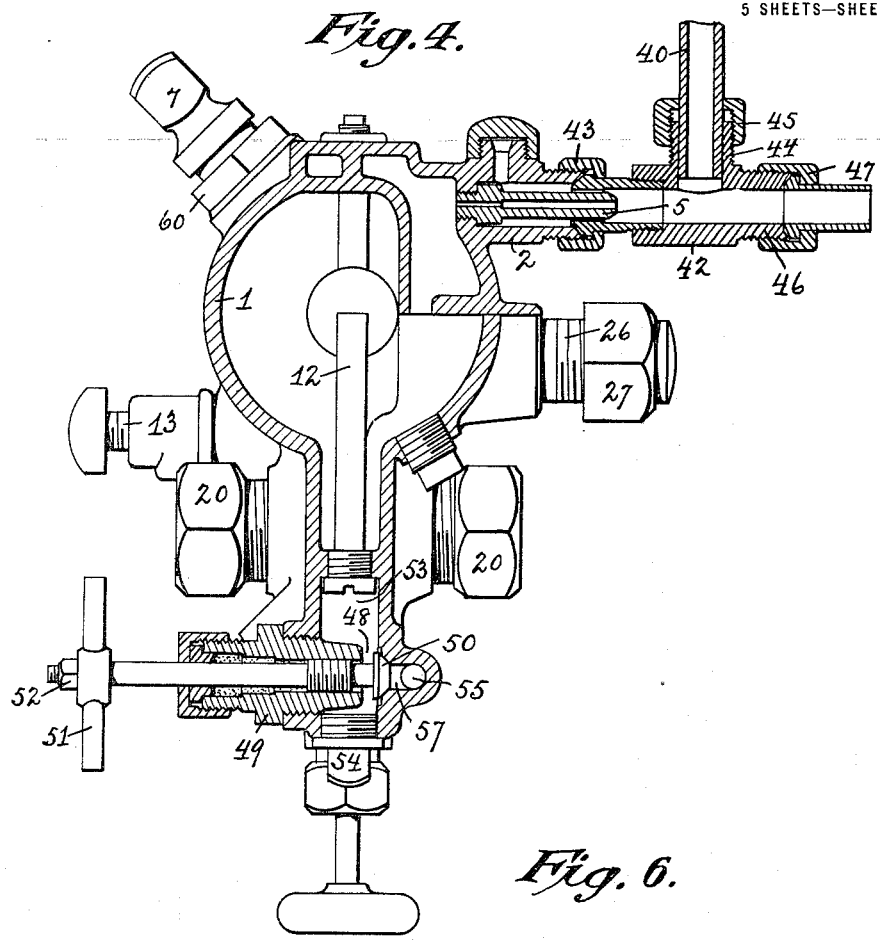
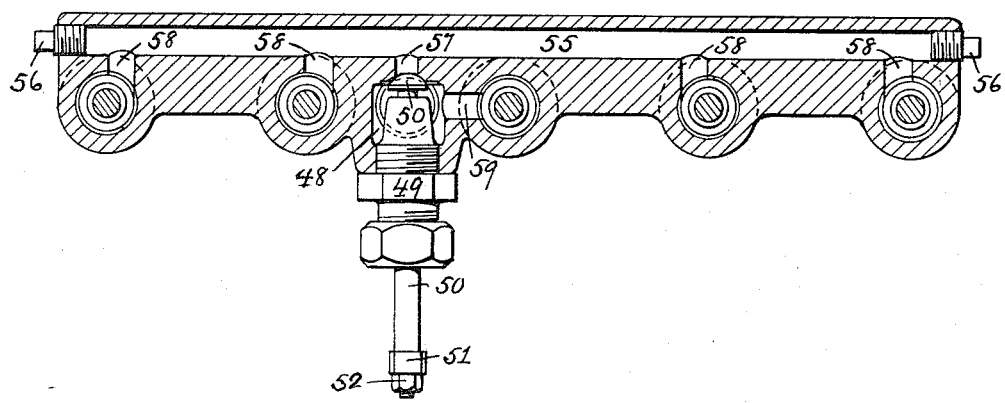

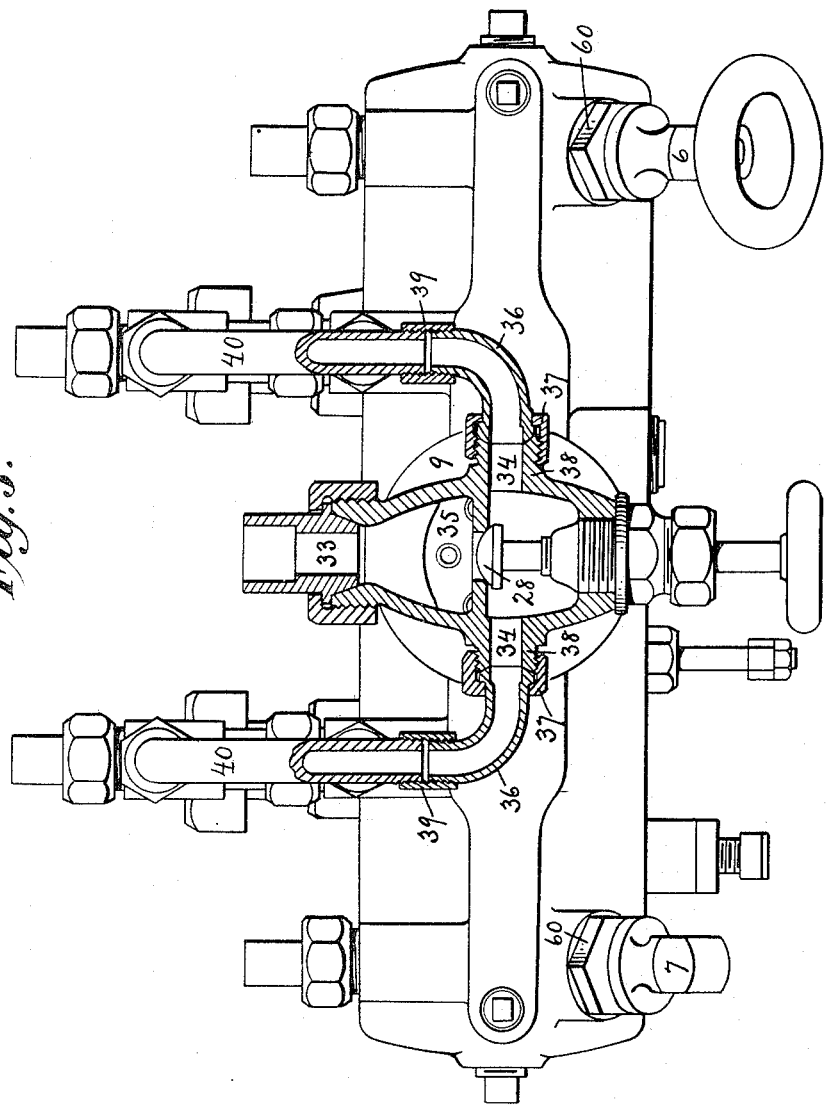

UNITED STATES PATENT OFFICE.

LEOPOLD KASSANDER, OF NEW YORK, N. Y., ASSIGNOR TO THE NATHAN MANUFACTURING COMPANY, OF NEW YORK, N. Y., A CORPORATION OF NEW YORK.

SIGHT-FEED LUBRICATOR FOR LOCOMOTIVES.

1,153,113.

Specification of Letters Patent. Patented Sept. 7, 1915.

Application filed December 24, 1913. Serial No. 808,573.

*To all whom it may concern:*

Be it known that I, LEOPOLD KASSANDER, a citizen of the United States, residing at New York, in the county of New York and State of New York, have invented certain new and useful Improvements in Sight-Feed Lubricators for Locomotives, of which the following is a specification.

This invention relates to improvements in multiple-feed lubricators such as are used in connection with locomotives in which the oil passes from a suitable reservoir in visible drops through a body of water into tallow pipes and then to the parts to be lubricated.

It is the particular object of my invention to provide such lubricators with means efficient to lubricate engines using superheated steam.

It is also my purpose to equip the device with a simple cut-out whereby communication between the oil reservoir and all of the oil discharge passages, except that one which leads to the air pump, may be closed. This has been found desirable, because the air pump is generally kept working while the engine is not running and requires lubrication, and the lubricator therefore should be so constructed as to preclude the possibility of interfering with the supply of oil to the air pump, even when the supply to the other parts is cut off.

In connection with locomotive engine lubrication, it develops occasionally that under severe conditions the feed of the lubricator is retarded by back pressure in the cylinder or steam chest, and the engine then does not obtain sufficient lubrication. It is desirable under such conditions to admit at the will of the operator, a supply of steam into the oil pipes in addition to that ordinarily passing through the choke plugs to assist the delivery of oil to the parts to be lubricated. Furthermore, when an engine, using superheated steam, is drifting, an excessively high temperature results in the steam chest and has a tendency to carbonize the oil. A supply of saturated steam, admitted into the oil pipes at such times, will effectively remedy these short-comings of proper lubrication, and it is the purpose of my invention to provide means for supplying such steam.

With this and other objects in view, my invention consists of certain novel combinations, constructions and adaptation of parts, all hereinafter described and illustrated.

Figure 2:
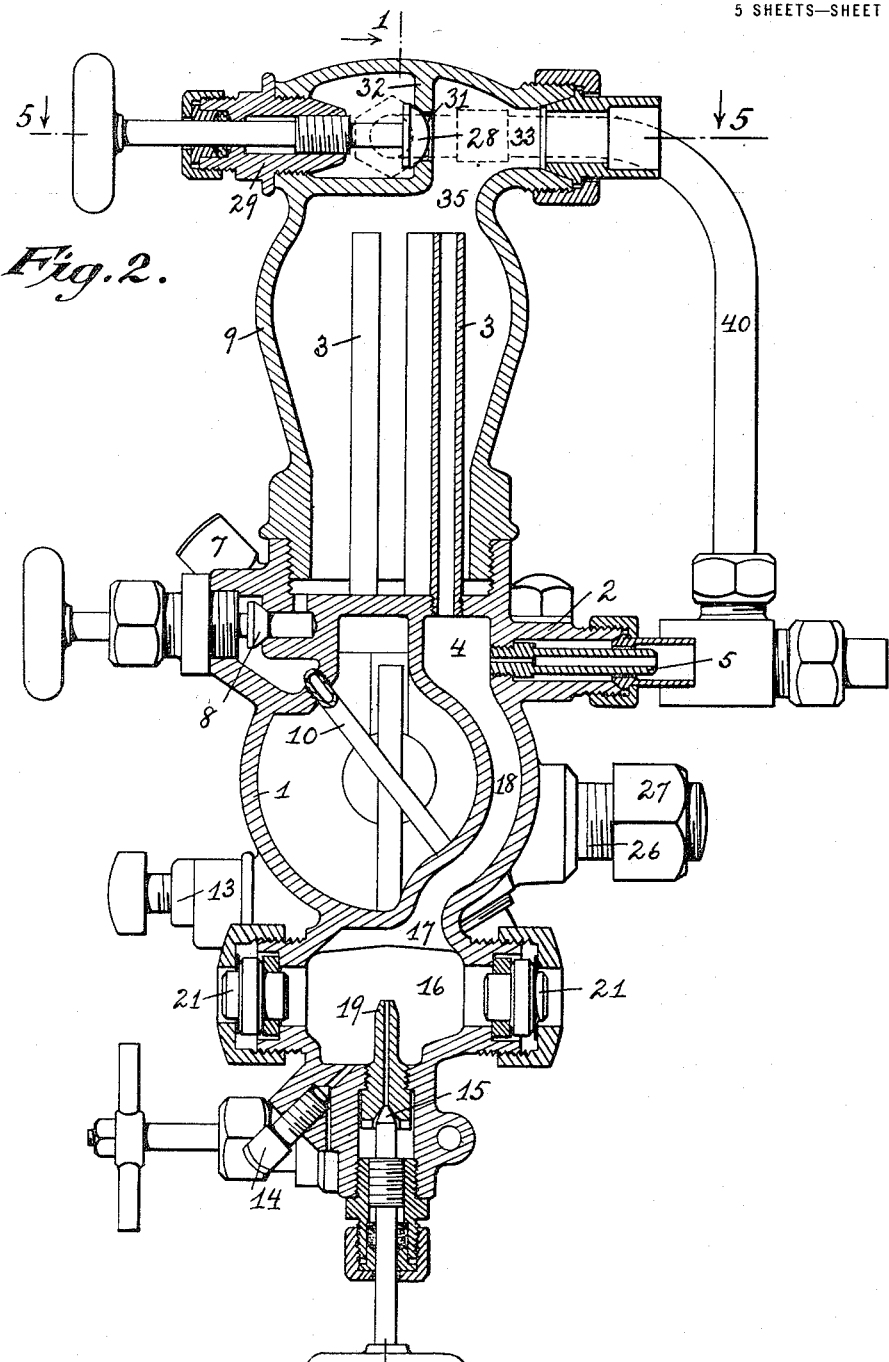

In the drawings, Figure 1 is a longitudinal vertical section along the plane of the line 1—1 in Fig. 2 of a multiple feed lubricator embodying the invention; Fig. 2 is a vertical cross section on the plane of the line 2—2 in Fig. 1; Fig. 3 is a cross section (and partial elevation) along the planes of the broken line 3—3 in Fig. 1, and Fig. 4 is a cross section along the plane of the line 4—4 in Fig. 1; Fig. 5 is a partial horizontal cross section and plan view of the parts taken on the plane of the line 5—5 in Fig. 2, and Fig. 6 is a horizontal cross section on the plane of the line 6—6 in Fig. 1.

In the drawings, 1 is a cylindrical oil reservoir placed horizontally and provided with threaded necks 2 to receive the oil pipes which lead to the parts to be lubricated. In the device illustrated there are five such necks connected to pipes leading, the two end ones on each side to the steam chests or cylinders respectively, and the one located in the center to the air pump of the locomotive.

3, 3 indicate equalizing pipes and 4, 4 equalizing passages which admit steam behind choke plugs 5.

6 indicates a filling plug provided on the extreme end of the oil reservoir.

7 is a similar plug, less the handle, interchangeable with the filling plug 6, so that it may be placed on either the right or the left side of the lubricator.

8 is a valve controlling the passage of water from a condenser indicated at 9 to the bottom of the oil reservoir 1 through a tube 10.

11 are gage glasses only one pair of which is shown, in section, in Fig. 3 to indicate the level of the liquid in the oil reservoir, and fronting the same are sight-feed glasses.

12 is an oil tube; 13 is a drain valve; 14 is a blow-out valve for the sight-feed chambers; 15 are feed regulating valves; 16 are sight chambers communicating through outlets 17 with channels 18 cast in the reservoir; 19 are feed nozzles in the lower part of the sight chambers; 20 are threaded casings in the front and back of the sight chambers and contain disk shaped sight-feed glasses 21. From the oil tube 12 lead the passages from which the oil is conducted to the sight chambers, and these oil passages and sight chambers are contained in a structure which is preferably cast in one piece and located below and outside of the oil reservoir.

22 indicates bosses on both sides of the interior of the lubricator which are provided with plugs 23 for the purpose of connecting an oiling attachment for the air cylinder of the air pump. They are also provided with oil tubes 24 for supplying oil to the air cylinder lubricating attachment, and which tubes 24 are inserted in the reservoir 1 by means of holes plugged by caps 25.

26 are rear extensions of the lubricator and 27 suitable nuts used to secure support brackets to the lubricator.

As above described, there is nothing essentially new in the lubricator or different from the lubricator described in Letters Patent of the United States, No. 1,022,741 issued to myself and Otto Best, April 9th, 1912, and it is in connection with such a lubricating device that I have utilized my inventions.

The condenser 9 is provided with a valve 28 and a suitable stuffing box 29, which valve controls an opening 31 in a bridge 32 and shuts off communication between a steam inlet 33 and a steam outlet 34. A passage 35, as can clearly be seen, insures an uninterrupted supply of steam to the main part of the condenser and the equalizing pipes 3.

36 are elbows connected by means of coupling nuts 37 to threaded necks 38 of the condenser 9. Couplings 39 connect the auxiliary steam pipes 40 to these elbows 36. T's 42, which are secured to the threaded necks 2 of the oil reservoir by means of couplings 43 (see Fig. 4), are provided with extensions 44 bored out interiorly to receive the lower ends of auxiliary steam pipes 40 and threaded exteriorly for nuts 45, provided to prevent leakage around steam pipes 40. The rear ends 46 of the T's 42 are threaded to receive couplings 47, to which are secured the oil pipes leading to the points to be lubricated.

It can readily be seen that by means of the arrangement above specified, additional steam can be supplied to the oil delivery passages ahead of the choke plugs 5 at the will of the operator, by simply opening or closing the valve as desired. I do not want to limit myself, however, to placing only two auxiliary steam pipes on the lubricator and onto the delivery pipes of the lubricator, as shown in the device illustrated, because I may place these attachments on any or all the feeds, with such alterations as are due to such a change, without departing in any way from the principle of the invention.

In the casting, which contains the sight-feed chambers and oil passages thus far referred to, and which is integral with and located below and outside the oil reservoir, at some suitable point; in this case, at a point between the center, or air pump feed, and the adjoining left hand cylinder, or steam chest feed, there is formed a chamber 48 which may be conveniently of cylindrical form, its axis being horizontal and crosswise of the length of the casting. The front wall of this chamber is formed by the stuffing box 49 of a screw valve 50 provided with T-handle 51 fastened to the spindle by means of a nut 52. The oil tube 12 and a channel 53 provide means of communication between the main reservoir 1 and the chamber 48, the channel 53 being fitted with a plug 54 to allow of the insertion of the oil tube 12.

In a portion of the casting, back of the chamber 48, is formed a horizontal oil channel 55 which extends lengthwise of the casting and is closed on both sides by plugs 56, and which channel communicates with the chamber 48 through an opening 57 controlled by the valve 50. Cross channels 58 provide means of communication between the channel 55 and all of the feeds except the center, or air pump feed (see Fig. 6). From the chamber 48 another passage 59 leads to the center feed, which passage is parallel to and directly in front of the channel 55. If it is desired to cut off all the feeds except the center one from communication with the main reservoir, it is only necessary to close the valve 50. This is shown in Fig. 6, which illustrates the valve in the closed position, and in which an uninterrupted supply of oil can still pass through the channel 59 into the air pump feed.

Bushings 60 having a portion of a polygonal exterior to provide gripping surfaces for a suitable wrench, are adapted to fit the filling plugs 6 or 7 as the case may be. Heretofore it has been customary to screw the filling plugs directly into the lubricator body, and, as these plugs have to be taken off for renewal of the oil supply quite often, the threaded portion of the lubricator into which the plugs are screwed, gradually become enlarged, causing considerable annoyance. To overcome this difficulty, the bushing 60 is screwed into the body with a left hand thread, so as to prevent its working loose, when the filling plug is screwed into it, as the latter has the customary right hand thread. As will be readily seen, this bushing can easily be renewed as soon as its threaded interior becomes worn, the body of the lubricator proper not being subject to wear.

What I claim is:

1. In a multiple feed lubricator, the combination with a lubricant reservoir, of a plurality of lubricant-conducting conduits, a common outlet from the reservoir to the various conduits, means for controlling the passage of lubricant through the common outlet to the different conduits, and another conduit that receives lubricant through said common outlet and being disposed out of the range of action and being independent of said controlling means.

2. In a multiple feed lubricator, the combination with an oil reservoir, of a plurality of conduits, means for delivering oil to the various conduits, including a passage common to the said conduits, a valve controlling said supply from the reservoir to the common passage, and another oil conduit supplied from the reservoir independently of the said common passage and being out of the range of action of the valve and independent of control by said valve.

3. In a multiple feed lubricator, the combination with an oil reservoir, of a plurality of conduits, means for delivering oil to the various conduits, including a passage common to said conduits and a supply passage from the reservoir to the common passage, a valve controlling the communication between the supply passage and the common passage, and another conduit having communication with the supply passage between the valve and the reservoir and being independent of control by said valve.

4. In a sight feed lubricator for locomotive engines, the combination with the usual oil reservoir, steam and oil delivery connections and pressure equalizing features, of a single oil tube, supplying oil to all oil feed conduits, and means to cut off all conduits except the one leading to the air pump feed, said latter conduit remaining open permanently and being out of the range of action of the cutting-off means independent of said cutting off means for the conduits leading to all other feeds.

5. In a sight feed lubricator for locomotive engines, the combination with a single oil tube and oil chambers located below the oil tube, and including a chamber for supplying the air pump, of an oil conduit, supplying oil to all feed chambers except the air pump feed through channels at substantially right angles to this main conduit, and a valve controlling the admission of oil to the main conduit, said air pump feed being out of the range of action of the valve and independent of the control by said valve.

6. In a sight feed lubricator for locomotive engines, the combination of a single oil tube and oil chamber below the oil tube, of an oil conduit supplying oil to all feed chambers except the air pump feed, a controlling means for said conduit, and a second conduit, substantially parallel to the first one, supplying oil to the air pump feed, and located wholly out of the range of action of the controlling means being independent of said controlling means of the first conduit and being permanently open.

7. In a sight feed lubricator for locomotive engines, the combination with a single oil tube and a single oil chamber below the oil tube, of two substantially parallel and independent conduits, one of these communicating with all feeds except the air pump feed, a valve controlling said conduit, and the other communicating only with the air pump feed, and being permanently open and being independent of the said control.

8. In a sight feed lubricator for locomotives, the combination with the usual steam pipe, equalizing pipes, choke plugs and oil conduits, of a condenser having two passages supplied from a common steam inlet passage, a valve controlling one of said passages in the condenser and supplying steam to the steam pipes which deliver the steam to the oil feed pipes, the other of these passages supplying steam to the condenser proper, to the equalizing pipes and to the passage back of the choke plugs, this second passage independent of control by the valve in the condenser.

9. In a sight feed lubricator for locomotives, a condenser, auxiliary steam pipes attached to the sides of the condenser, a valve controlled passage in the condenser delivering steam thereto, a second passage in the condenser independent of the valve controlled passage and independent of control by the valve in the condenser, and a common steam supply passage for both of said passages.

10. In a sight feed lubricator for locomotives, the combination with steam pipes, equalizing pipes, choke plugs and an oil feed pipe, of a condenser having two passages, one valve controlled in the condenser, supplying the steam pipes which deliver the steam to the oil feed pipe at the discharge end of the choke plugs, the other being independent of control by the valve in the condenser, supplying the equalizing pipes and passages back of the choke plugs and supplying the condenser for purposes of condensation to produce the necessary operating water column.

In testimony whereof I affix my signature in presence of two witnesses.

LEOPOLD KASSANDER.

Witnesses:
   HELEN V. FITZPATRICK,
   ALDA L. MILLER.